(No Model.) 5 Sheets—Sheet 4.
J. S. DAVIS.
HARVESTER.
No. 368,280. Patented Aug. 16, 1887.
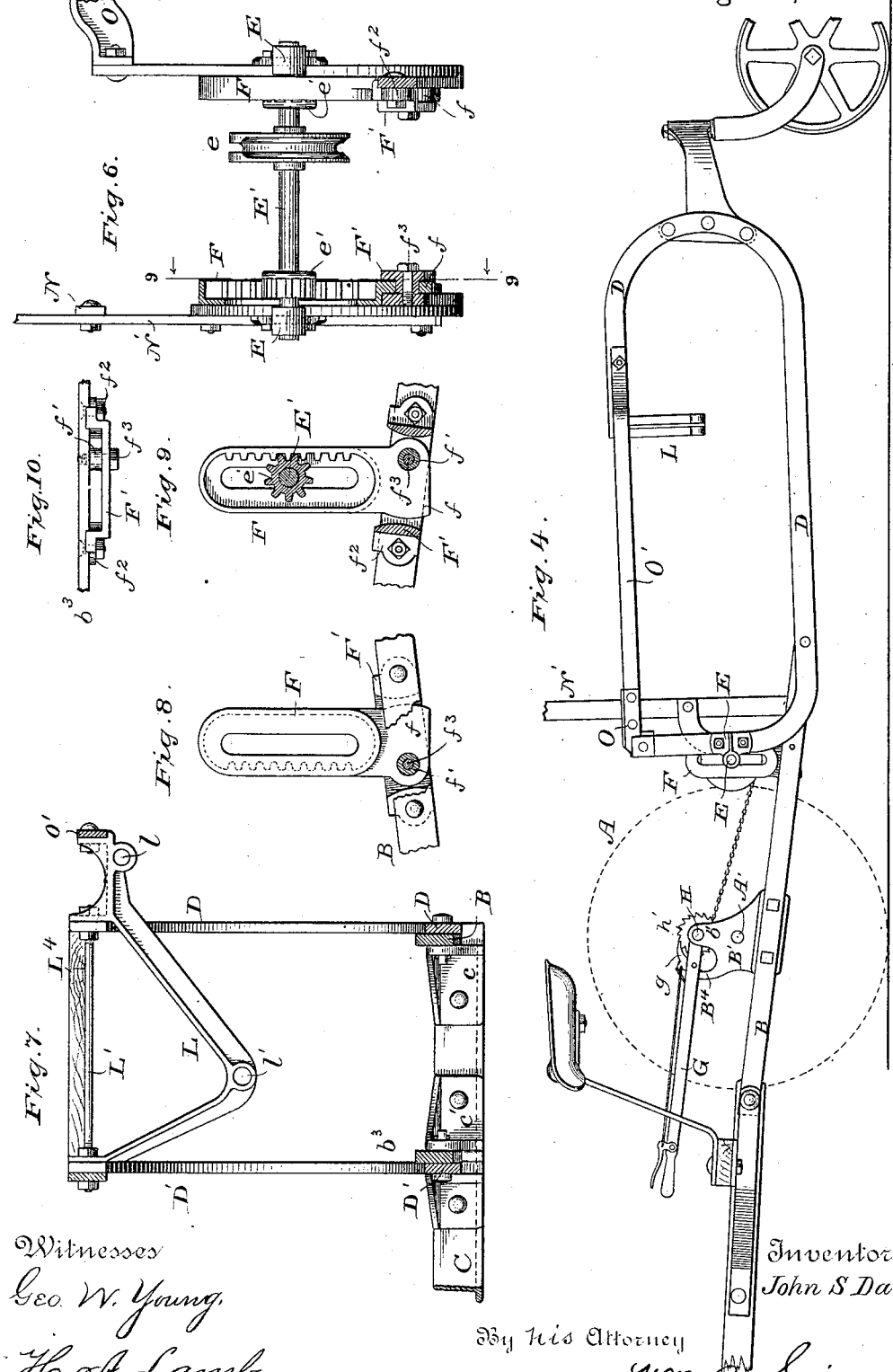
Witnesses
Geo. W. Young.
H. A. Lamb.
Inventor
John S Davis
By his Attorney

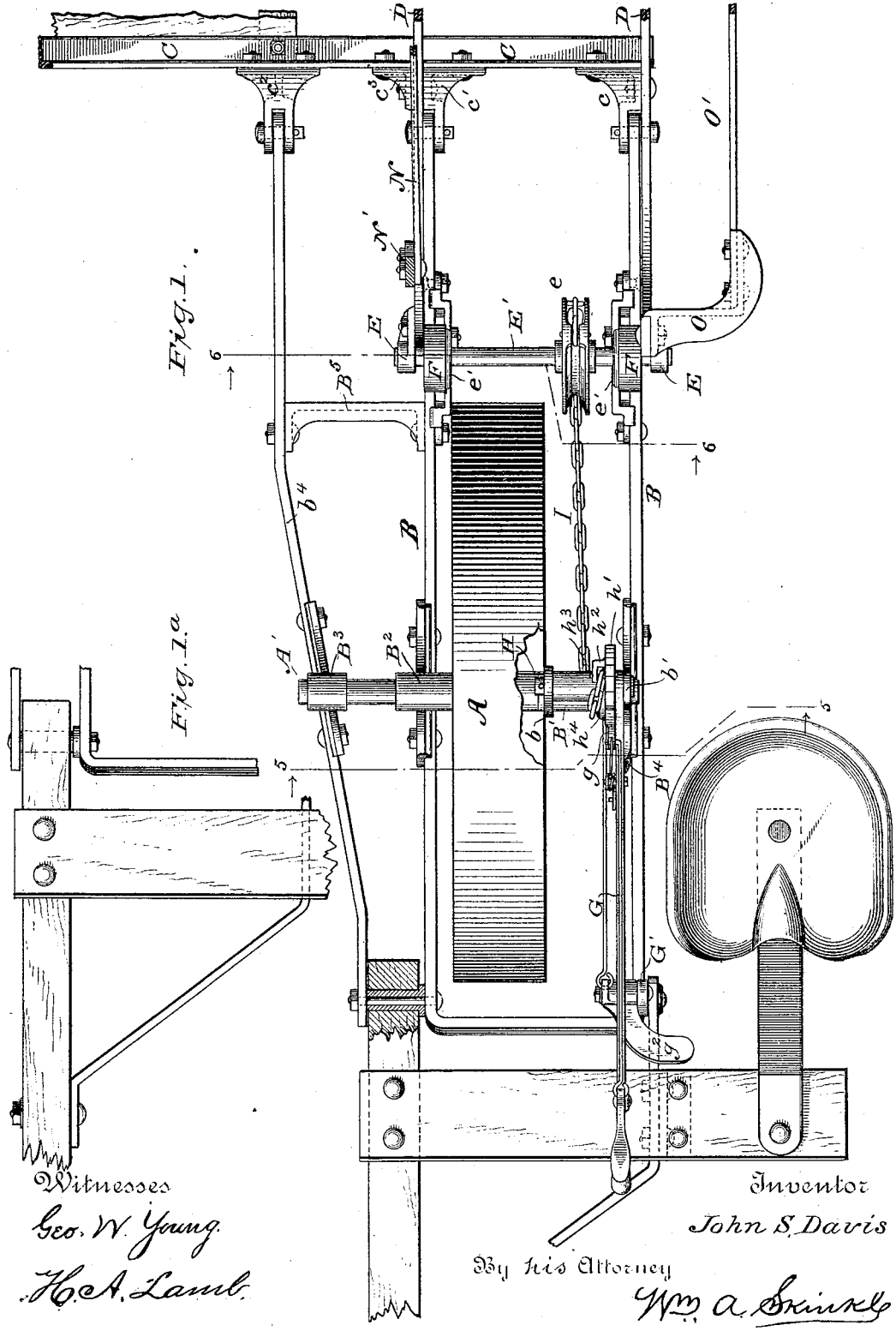

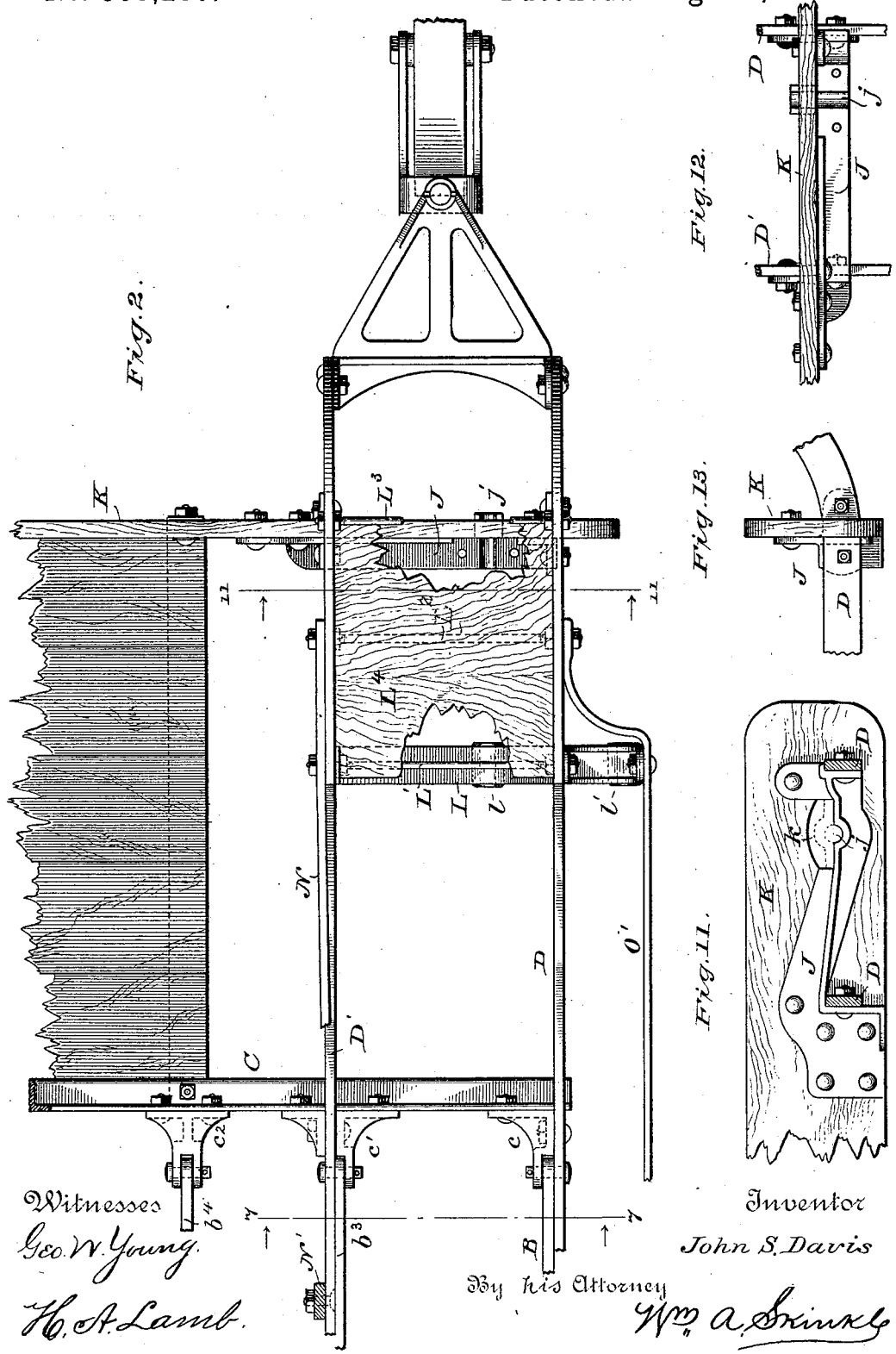

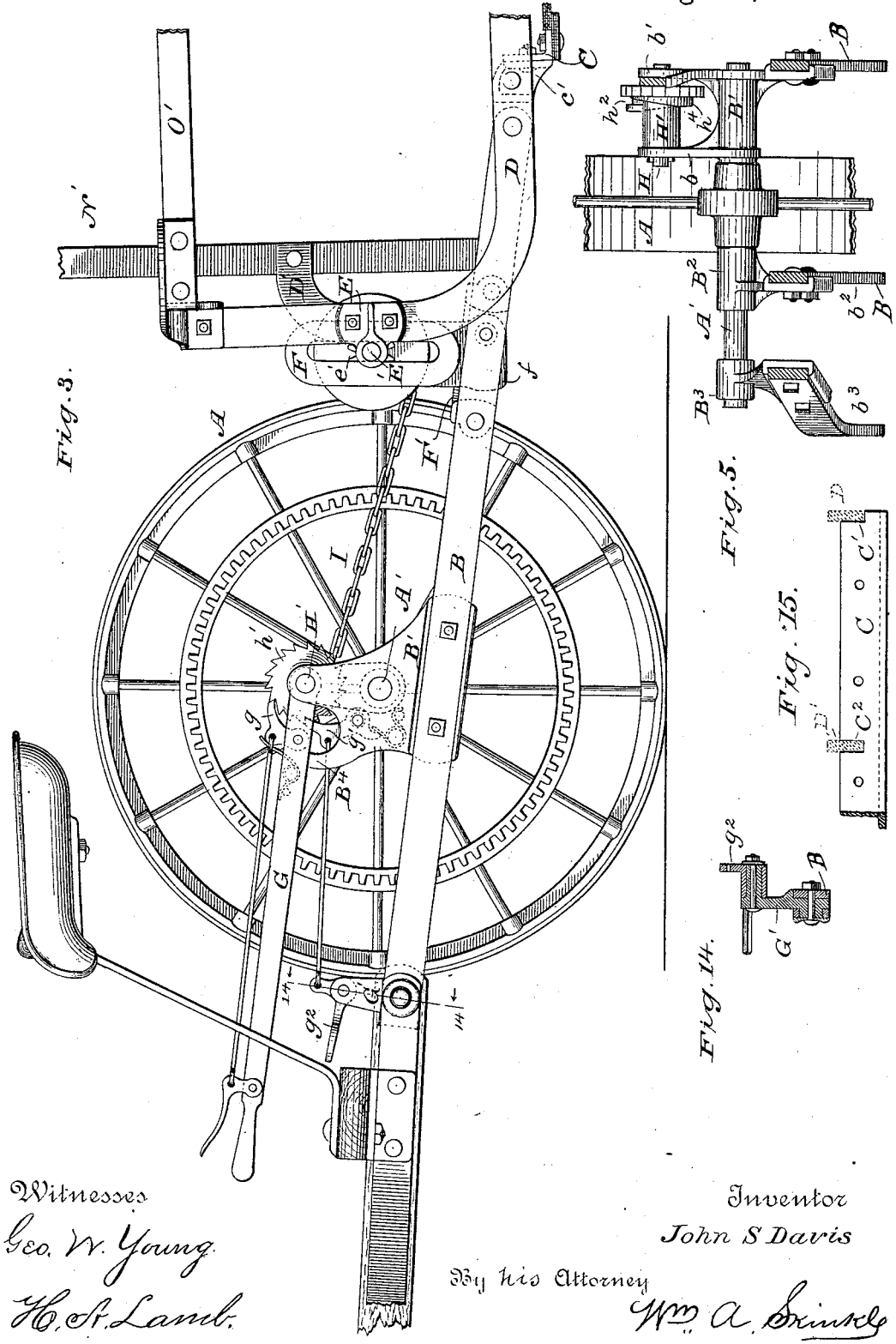

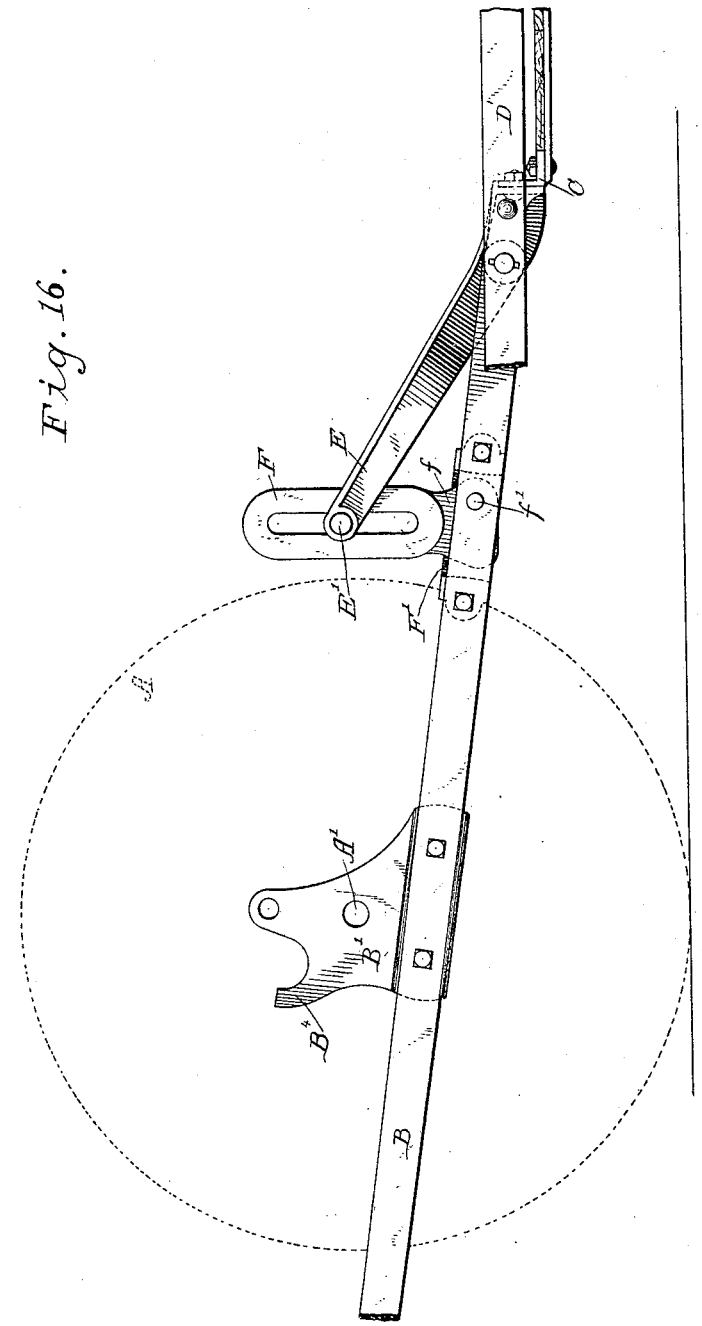

UNITED STATES PATENT OFFICE.

JOHN S. DAVIS, OF TOLEDO, OHIO, ASSIGNOR OF NINE-TENTHS TO THE TOLEDO MOWER AND REAPER COMPANY, OF SAME PLACE.

HARVESTER.

SPECIFICATION forming part of Letters Patent No. 368,280, dated August 16, 1887.

Application filed October 5, 1886. Serial No. 215,356. (No model.)

*To all whom it may concern:*

Be it known that I, JOHN S. DAVIS, a citizen of the United States, residing at Toledo, in the county of Lucas and State of Ohio, have invented certain new and useful Improvements in Harvesters; and I do hereby declare the following to be a full, clear, and exact description of the invention, such as will enable others skilled in the art to which it appertains to make and use the same.

My present invention relates to improvements in grain-binding harvesters of the class commonly known as "platform" or "lowdown" binders, in which the grain is gaveled and bound on or substantially on the level of the platform, many improvements in which class have been patented by me since July 4, 1882.

My object is to improve the construction of the wheel and platform frames and the mechanism by which they may be relatively adjusted to elevate or depress the cutting apparatus, the invention being particularly applicable to an improvement on the grain-binding harvester shown in the United States Patent No. 312,824, granted to me February 24, 1885.

In the accompanying drawings, which illustrate my invention in the best form now known to me, Figures 1, 1ª, and 2 together show a plan view of a harvester embodying my improvements, Fig. 1 showing the wheel-frame and its connection to the finger-bar of the platform, Fig. 1ª the tongue-frame and foot-board, and Fig. 2 the platform-frame with the binder-frame sill-bars mounted thereon and its rear caster-wheel support. Fig. 3 is a side elevation of the wheel-frame, or that portion of the machine shown by Fig. 1. Fig. 4 is a general side elevation, on a reduced scale, of the entire machine. Fig. 5 is a detail view in sectional elevation on the line 5 5 of Fig. 1; Fig. 6, a similar view on the line 6 6 of same figure; Fig. 7, a similar view on the line 7 7 of Fig. 2. Fig. 8 is a view in elevation of the pivoted rack-yoke. Fig. 9 is a similar view of the opposite side of the same, partly in section, on the line 9 9 of Fig. 6. Fig. 10 is a plan view of the guard-plate for the heel of the yoke. Fig. 11 is a side elevation, partly in section, on the line 11 11 of Fig. 2, of the metal bracket which unites the wooden rear sill of the platform-frame to the metal bars of the binder-frame. Fig. 12 is a plan, and Fig. 13 an end view of the same. Fig. 14 is a detail sectional view of the foot-latch and its supporting-standard. Fig. 15 is a detail view of a portion of the outer end of the finger-beam. Fig. 16 is a side elevation showing a modification of the manner of supporting the lifting-shaft.

In its general outline my invention resembles that shown in the before-mentioned Patent No. 312,824, the points of difference lying mostly in details, which improve and strengthen the construction of the machine and facilitate its operation. The driving-wheel and its surrounding frame, to which the tongue is hinged and braced, the platform-frame with its angle-iron, finger-bar, and wooden rear bar, connected at their outer ends by the metallic sill-bars of the binder-frame, the caster-wheel support at the rear end of the latter frame, the foot-board and seat supported on the tongue-frame, and the pivotal connection of the wheel-frame to the finger-bar of the platform are substantially as before described.

In practice it has been found that the tilting or rocking mechanism shown in Patent No. 312,824 interferes with the gear-plate upon which the operating mechanism of my binder is mounted, as shown in my Patents Nos. 274,441, March 20, 1883, and 275,330, April 3, 1883. This gear-plate is mounted upon the binder-sills in front of the finger-beam and the hinge-joint between the platform and wheelframes, while the adjusting-gear rack shown in Patent No. 312,824 is rigidly attached to the wheel-frame in advance of the gear-plate. Now, when the platform is tilted to drop the finger-beam close to the ground, the gear-plate mounted thereon pitches forward while the fixed rack on the wheel-frame pitches back, and the two pieces contact. As these two parts must be placed close together in order to preserve the harmonious and best working proportions of the machine as I now build it, their proximity has seriously limited the range of rocking adjustment because of the shortness of the rack I have been compelled to use.

I obviate this objection and in other ways increase the strength and efficiency of the machine as follows: The main wheel A turns freely upon the axle A', mounted in standards B' B² B³, attached to the bars of the wheel-frame B, as shown. This frame is pivoted at its rearward extremity to the binder-sill bars and to cast-metal brackets c c' c², secured upon the front face of the angle-iron finger-bar C. It has been my practice heretofore to place the finger-beam above the binder-sill bars; but this construction, while advantageous in some respects, prevents the near approach of the finger-beam to the ground. This is so objectionable that I have devised a plan for placing it below the sill-bars and securing it as firmly as before. The finger-beam is notched in its upper edge, as shown at C' C², Fig. 15, to receive the binder-sill bars D D', the brackets c c' c², secured to the beam and to the sill-bars, strengthening the beam at these points and compensating for the loss of metal through notching. The sill-bars D D' are upturned at their ends, as heretofore, and at a suitable point on the front upright portions I secure bearing-brackets E E, which support an adjusting-shaft, E', as shown in Fig. 16. These bearing-brackets might, however, be lengthened and attached directly to the platform-frame, the sill-bars being utilized to support them, only owing to their incidental shape and position. Upon this shaft, between its bearings, are mounted and keyed a chain-sheave, e, and pinions e' e', which take into geared racks F F, attached to the wheel-frame and made in the form of yokes, longitudinally slotted on one side to nicely embrace the shaft and open on the other to receive the pinions, as shown. The yokes are pivotally connected at their lower ends to the bars of the wheel-frame, and are provided on their inner faces with extending webs or tail-pieces f, which are perforated for the passage of the pivot-studs f' on the guard plates or straps F' F'. These plates are provided at their ends with offset feet or lugs f², which are bolted against the frame-bars, and they form slots in which the tail-pieces fit nicely, so as to vibrate freely on the pivot-studs f', which are cast hollow for the passage of additional securing-bolts, f³. It will be noticed that the yokes are pivoted at one side of their tail-pieces directly in line with the gear-teeth of the rack, so that the strains through the yokes are direct from the pinion-teeth to the pivots. The upper free end of the yokes are held against lateral motion in one direction by the upturned portions of the sill-bars D D' and in the other by the pinions e' e'.

It will be readily understood that as the platform is tilted to depress the finger-bar and the binder-gear plate rocked forward, the yokes F will also rock forward on their pivots and out of the way of the plate. I am thus enabled to use a rack of suitable length to attain any desired range of vertical adjustment of the finger-bar without being limited by the proximity and contact of these pivots.

Instead of mounting the tilting lever G directly upon the shaft E, as heretofore, I now mount it upon a shaft, H, supported in suitable bearings in two upwardly-projecting ears or lugs, b b', from the standard B', which supports the main axle. A chain-drum, H', is also loosely mounted upon the shaft H, and has a ratchet-wheel, h', upon its end next the lever, which is engaged by a spring lifting-pawl, g, pivoted on the lever, and as pring holding-pawl, g', pivoted on the standard B'. During the lowering operation the lifting-pawl may be withdrawn from the ratchet by means of a thumb-latch on the end of the lever, and the holding-pawl by means of a toe-latch, g², suitably pivoted on the main frame below the driver's seat. The manner of mounting the toe-latch is shown in detail by Fig. 14.

The standard G' is bolted to the side bar of the wheel-frame B, and has a rib or ledge resting upon the top of the bar. Upon its outer side is cast a boss, upon which the brace-bar of the tongue-frame is pivotally mounted, being held in place thereon by a washer and a bolt which passes through the hollow center of the boss and the frame-bar, securely clamping them together. Another cylindrical boss is formed at the top of the standard, and upon this the toe-latch g² is mounted, as shown, and held in place by a washer and bolt.

The chain-drum H' is formed with an ear or clip, h², between which and the inner face of the ratchet-wheel the end link of a chain, I, is secured by a pin, h³, which passes through holes in the ear and wheel. A spiral flange or rib, h⁴, is formed on the face of the drum, beginning at the point where the chain is attached and extending nearly one turn around the drum, terminating in the ear h⁴. This rib is to guide the chain properly as it begins to wind upon the drum, and prevents its "climbing" or winding one coil above another. The other end of the chain is attached to the sheave e on the adjusting-shaft E by means of a pin passing through the last link and the side flanges of the sheave, which are thickened at this point to strengthen them. As the sheave e is about twice the diameter of the drum H', the operator has a resulting increase in power when adjusting the machine. This disposition of the parts enables me to place the driver's seat as far forward as is necessary to correctly balance the machine, and by mounting the lever over the main axle it can be one of ordinary length, and will still be within convenient reach of the driver. The lever is loosely mounted on the shaft H, and when not in use rests horizontally on a stop or horn, B⁴, projecting from the hanger or standard, B', as shown.

I have found that the bars b³ b⁴ of the wheel-frame are greatly stiffened and the construction of the frame improved by the cross-brace B⁵. (See Fig. 1.)

The back board or rear sill-bar, K, of the platform is notched or perforated for the passage of the binder-sill bars D D' and the binder-actuating or crank shaft of the machine. A bracket, J, is securely bolted to the back board and to the sill-bars, as shown, and is provided with a half bearing-box, j, for the crank-shaft, the aperture k in the end board being large enough to permit the placing or removal of the cap thereof.

The upturned rear ends of the binder-sills are united at their extremities by a bracket, L, and are further stiffened and braced by three tie-bolts, L' L² L³, provided at each of their ends with a pair of clamping-nuts, which embrace the bars between them. A thin piece of board, L⁴, rests upon these tie-bolts, and is clamped between the sill-bars, adding to the strength and rigidity of the structure at this point.

The bracket L is preferably shaped to intersect the needle and packer shafts of the binding mechanism, and is formed with bearings l l' for their support.

In this application, as in my No. Patent 312,824, a brace or tie bar, N, extends from the overhanging rear end of the inner sill-bar to the reel-post N', and I have found in practice that it is necessary to similarly brace the end of the outer sill-bar. To accomplish this and not obstruct or interfere with the operative parts of the binding mechanism I am compelled to run the brace outside of the plane of the sill-bar. A casting or bracket, O, is bolted to the front upturned end of the sill and extends up and out to a proper point, where it is provided with a rearwardly-projecting foot, to which the brace-bar O' is attached, as shown. This brace then extends back to the other end of the sill, being turned in and provided with a foot, by which it is united to the sill-bar. The bracket L is also bolted to this brace-bar, as shown, to stiffen the structure.

What I claim, and desire to secure by Letters Patent, is—

1. The combination of the wheel-frame pivotally connected at its rear end to the platform, geared lifting-racks pivotally connected to the wheel-frame, and pinions mounted on a shaft supported from the platform-frame and engaging the pivoted racks, substantially as hereinbefore set forth.

2. The combination of the wheel-frame pivotally connected at its rear end to the platform, the sill-bars of the binder-frame rigidly attached to the platform and extending in front of the finger-beam, and the pivotal connection of the wheel-frame to the platform, and having their front ends upturned, a shaft supported in bearings on the upturned ends of the bars and provided with pinions, and lifting-racks pivotally connected to the wheel-frame and engaged by the pinions on the shaft, with means for revolving the shaft and thereby adjusting the frame, substantially as and for the purpose herein described.

3. The combination of the adjusting-shaft, pinions mounted thereon, and lifting-yokes pivotally connected to the wheel-frame and provided with a geared rack engaged by the pinions, one side of the yokes being open to receive the pinions and the other side closed by a web having longitudinal slots closely embracing the shaft, which plays therein during the adjusting movements, substantially as and for the purpose set forth.

4. The combination of the adjusting-shaft and its pinions with the lifting-yokes having geared racks engaged by the pinions and webs slotted to embrace the shaft, the yokes being mounted upon pivots located on the pitch-line of the teeth in the racks, substantially as set forth.

5. The combination of the wheel and platform frames constructed and pivotally connected as hereinbefore described, the binder-sill bars rigidly connected to the platform and having their front ends upturned, an adjusting-shaft with pinions mounted on the upturned ends of the binder-sills, lifting-yokes pivoted on the wheel-frame and provided with racks engaged by the pinions, and slotted webs on one side embracing the shaft, the yokes being held against lateral motion by the pinions on one side and the binder-sill bars on the other, substantially as set forth.

6. The combination of the wheel-frame bars, the guard-plates or straps F' and their pivot-studs, and lifting-yokes having geared racks engaged by pinions on the adjusting-shaft and provided with webs or tail-pieces f, which lie in the slots formed between the guard-plates and the said frame-bars and are perforated to fit upon the pivot-studs of the guard-plates, substantially as and for the purpose set forth.

7. The combination of the main wheel, the wheel-frame pivoted at its rear end to the platform-frame, geared lifting-racks attached to the wheel-frame, an adjusting-shaft mounted in bearings supported from the platform-frame and extending across the path of the main wheel in rear thereof and provided with spur-pinions which engage the racks, and a sheave connected by a chain to a winding-drum mounted on the wheel-frame, with means for revolving the drum, substantially as and for the purpose set forth.

8. The supporting-standard B', ribbed on its outer face to embrace the frame-bar and having a tubular sleeve projecting from its inner face to form a bearing for the main axle, and upward extensions on the bracket and inner end of the sleeve to form bearings for the winding-drum axle, substantially as set forth.

9. The supporting-standard B', consisting of an upright standard ribbed on its outer face to embrace the frame-bar, a tubular sleeve projecting from its inner face to form a bearing for the main axle, a stop or horn projecting forward and inward to form a rest for the lifting-lever, and upward extensions on the bracket and inner end of the sleeve to form bearings for the winding-drum shaft, substantially as set forth.

10. The combination of the wheel and platform frames pivotally connected, as described, the lifting-racks on the wheel-frame, the adjusting-shaft with its pinions mounted in bearings on the platform in rear of the main wheel, a sheave on the adjusting-shaft connected by a chain to a winding-drum supported above the main axle by the standard B' and provided with a toothed flange, the lifting-lever pivoted on the drum-shaft, the pawl thereon engaging the ratchet, and a holding-pawl mounted on the standard, substantially as and for the purposes set forth.

11. The combination of the binder-sill bar D, rigidly attached to the platform and provided with upturned ends, as shown, the brace O', uniting the upturned ends of the sill-bar, but lying in a plane outside of the sill-bar, and provided at its ends with side projections or feet by means of which it is attached to the bars, substantially as hereinbefore described.

12. The combination of the platform-frame, the binder-sills rigidly attached thereto and upturned at their ends, the bars N and O', bracing the rear upturned ends of the sills, as described, and the bracket L, attached to the ends of the sills and to the brace-bar O' and provided with bearing-boxes $l\ l'$, substantially as described.

13. The combination of the angle-iron finger-bar, the binder-sill bars located above the finger-bar and resting in notches therein, and the brackets $c\ c'$, attached to the sill-bars and to the finger-bar, substantially as and for the purpose hereinbefore set forth.

14. The combination of the binder-sill bars, the angle-iron finger-beam to which they are attached, the wooden rear sill of the platform notched or perforated for the passage of the sill-bars, and the bracket J, rigidly attached to the sill-bars and platform-beam and provided with a bearing-box, $j$, for the crankshaft, substantially as described.

In testimony whereof I affix my signature in presence of two witnesses.

JOHN S. DAVIS.

Witnesses:
   J. H. SOUTHARD,
   CARRIE T. SOUTHARD.